United States Patent [19]

Tanaka et al.

[11] 4,156,052

[45] May 22, 1979

[54] MAGNETIC RECORDING MEDIUM

[75] Inventors: Toshiro Tanaka, Izumi; Yoshiaki Hisagen, Sendai, both of Japan

[73] Assignee: Sony Corporation, Tokyo, Japan

[21] Appl. No.: 880,070

[22] Filed: Feb. 22, 1978

[30] Foreign Application Priority Data

Feb. 24, 1977 [JP] Japan .............................. 52-1947677

[51] Int. Cl.² .............................................. H01f 10/02
[52] U.S. Cl. ...................................... 428/500; 428/900
[58] Field of Search .............................. 427/127–132, 427/48; 428/900, 500; 252/62.54; 256/59

[56] References Cited

U.S. PATENT DOCUMENTS

| 3,492,235 | 1/1970 | Matsumoto et al. ............... 252/62.54 |
| 3,838,049 | 9/1974 | Souillard .............................. 252/59 |

*Primary Examiner*—Bernard D. Pianalto
*Attorney, Agent, or Firm*—Hill, Gross, Simpson, Van Santen, Steadman, Chiara & Simpson

[57] ABSTRACT

An improved magnetic recording medium comprising a non-magnetic base, and a magnetic layer formed on the non-magnetic base and containing magnetizable particles dispersed in a resinous binder. The magnetic layer includes an isobutylene oligomer in sufficient amounts to function as a lubricating agent for the magnetic recording medium.

4 Claims, No Drawings

MAGNETIC RECORDING MEDIUM

BACKGROUND OF THE INVENTION

1. Field of the Invention

The present invention relates to a magnetic recording medium with an improved magnetic layer coated thereon, the layer having an isobutylene oligomer as its essential lubricating agent.

2. Description of the Prior Art

In recent times, the characteristics required of a suitable magnetic recording medium such as a magnetic tape, a magnetic sheet, a magnetic disk, or the like have become much more severe. This is especially true in magnetic tape used for recording video signals where the so called "still picture" characteristic is important, and in magnetic tapes for recording audio signals as well as magnetic tapes used for measuring. In these instances, a repeating travelling characteristic and anti-abrasion properties become most important.

Heretofore, in order to improve the still picture characteristic, the repeating travelling characteristic, and the wear resistance characteristic, various binders, lubricants, additives and the like have been tried but particularly good results have not been obtained. Any lubricating agent must function without deteriorating the electromagnetic conversion characteristics, the head wear, the viscosity characteristics of the paints, and the like. Until the present time, the main objective in selecting a lubricant has been to smooth the travelling of the magnetic tape and to prevent the generation of Q-sounds and wow-flutters by reducing the friction factor existing during the low speed travel of the tape.

In the prior art, there have been various lubricants used in magnetic layers as for example higher fatty acids (for example, oleic acid, linoleic acid, ricinoleic acid, stearic acid, lauric acid, palmitic acid, capric acid, myristic acid, elaidic acid, stearolic acid, and the like which fatty acids contain 8 to 18 carbon atoms) and their fatty acid esters, or individual or mixtures of fatty acids of metallic salts, liquid paraffin, silicone oils, olive oil, and the like. Powdered materials such as graphite, carbon, molybdenum disulfide, boron nitride, tungsten disulfide, and powdered polyfluorovinyl polymers have also been tried.

The results obtained with olive oil, zinc stearate, ethyl stearate and silicone oils being used as lubricants have not proved satisfactory, as will be described in a succeeding portion of this specification.

When well known paraffin system and olefinic system lubricants are used in place of olive oil, the melting points of these lubricants being in the range from $-5°$ C. to $50°$ C. are such that they cause "blooming" and therefore do not reduce the friction factor.

When a powdered lubricant is used, the volume in the magnetic layer which is occupied by the magnetic powders or particles is reduced. Therefore, the output from the magnetic tape is lowered and the uniform dispersion of the magnetic powders is disturbed, resulting in the production of a tape noise. Such a magnetic layer is no longer suitable for a magnetic tape for recording a short wave signal such as a video signal.

The most pertinent prior art with which the applicants are aware is a Japanese Patent Application Publication No. 6727/1967 which discloses a lubricant composed of a squalane having the empirical formula $C_{30}H_{62}$ and the chemical name 2, 6, 10, 15, 19, 23-hexamethyl-tetracosane. However, this squalane is produced by hydrogenation of a squalene derived from the liver oil of a shark and is therefore quite expensive. This material can be produced by synthesis but is still quite expensive.

SUMMARY OF THE INVENTION

The present invention provides a magnetic recording medium which is free from blooming properties and is stable with respect to durability, heat resistance and water resistance. The magnetic recording medium of the present invention consists of a non-magnetic base and a magnetic layer formed thereon which includes magnetizable particles dispersed in a resinous binder and a sufficient amount of lubricant to provide lubricating properties to the magnetic layer.

The lubricant used in the practice of the invention is known as an isobutylene oligomer (low molecular weight polymer) whose chemical formula can be expressed as follows:

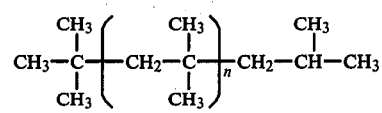

where n is an integer, preferably from 2 to 11.

DESCRIPTION OF THE PREFERRED EMBODIMENTS

Magnetic recording media, such as flexible magnetic recording tapes or relatively rigid magnetic recording disks, produced in accordance with the present invention, exhibit superior wear-resistance characteristics, anti-blooming characteristics, heat resistance, and water resistance as compared with prior art magnetic recording media.

The lubricant used in accordance with the present invention is an isobutylene lower polymer or oligomer contained in the magnetic layer of a magnetic recording medium, the chemical structure of the oligomer being as follows:

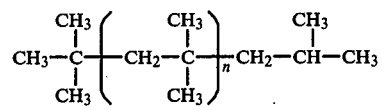

where n is an integer from 2 to 11, so that the oligomer has from 16 to 52 carbon atoms.

The best results, as apparent from the examples described hereinafter, are obtained when the isobutylene oligomer is one in which n is from 2 to 11, so that the total number of isobutylene units, including the two terminal units, is in the range from 4 to 13. More strictly speaking, it is preferred to use an oligomer wherein n is 3 to 8, so that there is a total of 5 to 10 isobutylene units, or 20 to 40 total carbon atoms. In the case of an oligomer wherein n is less than 1, the lubricating property is very low, or almost zero and the presence of such an oligomer serves to soften the binder and this results in excessive peeling off of magnetic powders or particles from the magnetic layer. On the other hand, where the oligomer has a value of n which is more than 11, there has been observed deteriorations of the still characteristics, and peeling off of magnetic particles.

It is desirable that from 1 to 15 parts by weight of isobutylene oligomer are added to and contained in 100 parts by weight of the resinous binder. Even more preferably, from 2 to 10 parts by weight of the isobutylene oligomer are added to and contained in 100 parts by weight of the resinous binder. If the amount of isobutylene oligomer is lower than 1 part per 100, no lubricating effect is achieved, while the addition of amounts in excess of 15 parts per hundred is results in a softened binder, so that the still characteristics and the peeling off characteristics of the magnetic recording layer are deteriorated.

As may be apparent from the above chemical formula, the isobutylene polymer may be polymerized as a head-tail type, but it is also possible that within the degree of polymerization mentioned, the isobutylene oligomer can contain units of a head-head type, or a tail-tail type unit as exemplified in formulas (1) and (2), respectively, given below:

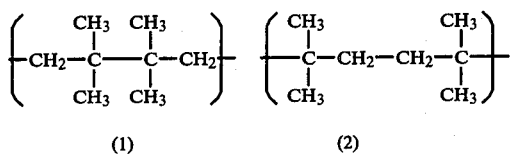

(1)  (2)

Accordingly, if the terminal groups are two tert-butyl groups (3) or two isopropyl groups (4) as illustrated in the following formulae, the above isobutylene oligomer should also be considered as within the scope of the invention.

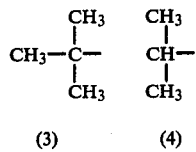

(3)  (4)

Suitable ferromagnetic material powders or particles which can be used in the present invention include any ferromagnetic material which finds use in a magnetic recording medium. For example, we can use gamma $Fe_2O_3$, $Fe_3O_4$, a spinel structure constituting an intermediate phase between gamma $Fe_2O_3$ and $Fe_3O_4$, cobalt doped gamma $Fe_2O_3$, cobalt doped $Fe_3O_4$, a cobalt doped spinel structure as aforementioned, chromium dioxide, barium ferrite, various alloys or particles, such as Fe-Co, Co-Ni, Fe-Co-Ni, Fe-Co-B, Fe-Co-Cr-B, Mn-Bi, Mn-Al, Fe-Co-V, and the like, iron nitride or mixtures thereof.

The resinous material which is used as a binder can also be one of an extremely wide variety of binders useful in the magnetic recording art. Purely by way of example, we can mention vinyl chloride-vinyl acetate copolymers, vinyl chloride-vinyl acetate-vinyl alcohol copolymers, vinyl chloride-vinyl acetate-maleic acid copolymers, vinyl-chloride-vinylidene chloride copolymers, vinyl chloride-acrylonitrile copolymers, acrylic acid ester-acrylonitrile copolymers, acrylic acid ester-vinylidene chloride copolymers, methacrylic acid esters-vinylidene chloride copolymers, methacrylic acid ester-styrene copolymers, thermoplastic polyurethane resins, phenoxy resins, polyvinyl fluoride resins, vinylidene chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyrals, polyvinyl acetals, cellulose derivatives, styrene-butadiene copolymers, polyester resin, phenolic resins, epoxy resins, thermosetting polyurethane resins, urea resins, melamine resins, alkyd resins, urea formaldehyde resins and mixtures of these materials. When a polyisocyanate curing agent is sued as a crosslinking agent for the binder, it is desirable that the amount of curing agent constitutes from 10 to 40 weight percent relative to the total amount of binder.

The non-magnetic base for the magnetic recording medium of the present invention can also be any of an extremely wide variety of materials. For example materials containing polyester groups such as polyethyleneterephthalate and the like, polyolefin groups such as polypropylene and the like, cellulose derivatives such as cellulose triacetate, cellulose diacetate and the like, polycarbonates, polyvinyl chlorides, polyimides, metallic materials such as aluminum, copper, and the like, as well as paper and the like can be used.

Upon preparing the magnetic paint of the present invention, various materials can be used as an organic solvent. One can use compounds having a ketone group such as acetone, methylethylketone, methylisobutylketone, cyclohexanone and the like. There may be alcohol groups present such as in methanol, ethanol, propanol, butanol and the like. The solvent may include ester groups such as in methyl acetate, ethyl acetate, butyl acetate, ethyl lactate, ethylene glycol acetate monoethylether and the like. It may contain a glycol ether group such as in ethylene glycol-dimethylether, ethylene glycol-monoethylether, dioxane and the like. The solvent may be an aromatic hydrocarbon such as benzene, toluene, xylene, and the like. It may be an aliphatic hydrocarbon such as hexane, heptane and the like. Substituted hydrocarbons such as nitropropane and the like can be used. For the purposes of this invention, these solvents can be used individually or in combination.

The magnetic layer of the recording medium may include an abrasive agent such as aluminum oxide, chromic oxide, silicon oxide or the like which materials can be used separately or in combination.

In keeping with modern practice, carbon black may be used as an anti-static agent and lecithin can be used as a dispersing agent.

The present invention will be described with reference to Examples and Comparisons. The components, the ratios thereof, the manners of processing, and the order thereof can be easily varied within the scope of the invention, as will be apparent to one skilled in the art.

EXAMPLE 1

A mixture was made up as follows:
Acicular magnetic powders or particles of gamma-$Fe_2O_3$—400 weight parts
(average length of particle being 0.5 micron and acicular ratio being 4 to 5)
Vinyl chloride-vinyl acetate-vinylalcohol copolymer—50 weight parts
(Copolymer ratio (weight ratio) of vinyl chloride:vinyl acetate:vinylalcohol being 91:3:6 which is a "Vinylite VAGH" (Trademark of Union Carbide Co., Ltd.)
Thermoplastic polyurethane resin—50 weight parts
(made by B. F. Goodrich Chemical Co., its Trademark being "Estane 5701")
Lecithin (as dispersion agent)—4 weight parts
Isobutylene Oligomer (A)—5 weight parts
Butyl Acetate (as solvent(—300 weight parts
Toluene (as solvent)—300 weight parts The above materials were charged into a ball mill and then mixed therein for 20 hours to produce a magnetic paint. The magnetic paint was coated on a polyethylene terephthalate film of 1 Mil in thickness, to produce a residual dry coating of magnetic paint measuring 6 microns. This surface was treated by a supercalender, then cut to a width of ½ inch and wound upon a reel.

In the composition as above identified, the isobutylene oligomer (A) is one in which the value of n is distributed with a value of 4 to 5 as its center. It included oligomers consisting predominantly of 6 to 7 isobutylene units. The oligomers including isobutylene units of 6 and 7 constituted at least 60% or more of the oligomer mixture, and the other polymers included small amounts of a 5 unit oligomer, an 8 unit oligomer, and a 9 unit oligomer respectively.

The magnetic recording medium thus manufactured was examined and tested for its still and peeling off characteristics by a VTR model AV-3700, made by Sony Corporation.

In the testing of still characteristics, a video signal of 4.2 MHz was recorded on the magnetic recording medium and the time period in which the output signal therefrom was attenuated by 50% was measured. The peeling off characteristics were tested in a manner such that the portion of the magnetic recording medium which corresponded to the length of 60 minutes of travel was repeatedly travelled by 100 times and then the amount of magnetic particles peeling off from the magnetic recording medium to the head, head drum, head guide and the like of the VTR were evaluated. The loss of more than 5 milligrams of material was taken as unacceptable. The powders peeled off from the magnetic recording medium were gathered by wiping the head, head drum, head guide and the like dissolved in nitric acid, and then a rhodanate salt was dissolved therein. By means of colorimetry, the rhodan color development was determined. That is, the absorption factor based upon the absorption spectrum was plotted to the previously determined equation or graph on the concentration-absorption factor and the corresponding concentration, i.e. the peeling off of the particles was observed. The variation which is referred to in the attached Table shows the number of milligrams of magnetic particles peeled off from the tape to the contact members. Also, with respect to the blooming of lubricants in the attached Table, the symbol x represents the existence of blooming, the symbol s represents a small amount of blooming, and the symbol o represents no apparent blooming, respectively.

EXAMPLES 2 TO 7

A magnetic recording medium was prepared in the same manner as described in Example 1, but the addition of isobutylene oligomer was change to 0.5, 1, 2, 10, 15 and 20% by weight respectively.

The various characteristics of the magnetic recording media of Examples 1 to 7 are shown in the attached Table. The still characteristics of Examples 1, 4 and 5 are excellent because they extended more than 60 minutes and they were also good in wear resistance. The melting point of the isobutylene oligomer (A) is less than $-20°$ C. so that it is readily compatible with various kinds of binders, is free from blooming, sand exhibits good heat resistance and water resistance.

The tape of Example 2 showed a low wear resistance because the amount of lubricant added was too small to achieve lubrication.

Example 7 was not satisfactory because of its still and peeling off characteristics probably because the amount of isobutylene oligomer was excessive, and the binder was thereby softened.

EXAMPLE 8

In this Example, the isobutylene oligomer (A) was replaced by an isobutylene oligomer (B) but the other composition and manufacturing conditions were substantially the same as those of Example 1. The isobutylene oligomer (B) has a value of n such that its distribution center is about 3 and is a mixture of oligomers whose major portion is occupied by an oligomer having 5 isobutylene units, and having other fractions composed of oligomers having 6 units, 4 units, and 7 units in decreasing order. Stated another way, the isobutylene oligomer (B) is a mixture of oligomers having a value of n as previously defined from 2 to 5.

EXAMPLE 9

In Example 9, the isobutylene oligomer (A) used in Example 1 was replaced by an isobutylene oligomer (C), but the other compositions and manufacturing conditions thereof were substantially the same as those of Example 1. The isobutylene oligomer (C) used in this Example has an n value such that its distribution center is about 6, and constitutes a mixture of oligomers whose major portion consists of an oligomer having 8 isobutylene units and whose other portions consist of oligomers having 9 units, 7 units, 10 units, 6 units, 11 units and 5 units in decreasing order.

The isobutylene oligomer (C) is thus a mixture of oligomers whose value of n is in the range of 3 to 9.

EXAMPLE 10

In this Example, the isobutylene oligomer (A) used in Example 1 was reduced by an isobutylene oligomer (D) but the other compositions and manufacturing conditions are substantially the same as those in Example 1. The isobutylene oligomer (D) of Example 10 has an n which has a distribution center about 8 and constitutes a mixture of oligomers whose major portion is an oligomer having 10 isobutylene units and having other portions consisting of oligomers having 11 isobutylene units, 9 units, 12 units, 8 units, and 13 units in decreasing order. The isobutylene oligomer (D) is a mixture of oligomers whose n value is thus in the range from 6 to 11.

COMPARISON 1

In making this comparison, the isobutylene oligomer (A) used in Example 1 was replaced by isobutylene oligomer (E) but the other compositions and manufacturing conditions thereof are substantially the same as those of Example 1 The isobutylene oligomer (E) used in this comparison has an n value in the previous formula which has a distribution center about 12 and is a mixture of oligomers whose major portion consists of an oligomer having 14 isobutylene units and whose other portions contain oligomers having 15 units, 13 units, 16 units, 12 units, and 17 units. Thus, the isobutylene-oligomer (E) is a mixture of oligomers having an n value from the previous chemical formula of from 10 to 14. In this Example, the number of oligomers having 12 and 13 n units is lower than about 20%.

COMPARISON 2 and a low still characteristic because the cohesive force of the binder was lowered.

| Number of Examples and Comparisons | Lubricant | Added Amount (weight %) | Melting Point (°C.) | Still Characteristic (minutes) | Peeling-off characteristic | Blooming |
| --- | --- | --- | --- | --- | --- | --- |
| Example 1 | Isobutylene oligomer (A) | 5 | lower than −20 | more than 60 | −2 | 0 |
| 2 | " | 0.5 | " | smaller than 30 | −1 | 0 |
| 3 | " | 1 | " | 30–60 | −1 | 0 |
| 4 | " | 2 | " | more than 60 | −1 | 0 |
| 5 | " | 10 | " | " | −2 | 0 |
| 6 | " | 15 | " | 30–60 | −2 | 0 |
| 7 | " | 20 | " | smaller than 30 | −3 | 0 |
| 8 | Isobutylene oligomer (B) | 5 | lower than −30 | more than 60 | −2 | 0 |
| 9 | Isobutylene oligomer (C) | 5 | lower than −20 | " | −2 | 0 |
| 10 | Isobutylene oligomer (D) | 5 | lower than 0 | 30–60 | −2 | 0 |
| Comparison 1 | Isobutylene oligomer (E) | 5 | " | smaller than 5 | −3 | s |
| 2 | 2,2,4,4,6-penta-methylheptane | 5 | 33.4 | smaller than 1 | −4 | 0 |
| 3 | Olive oil | 5 | 0–6 | 30 | −2 | 0 |
| 4 | Dimethyl silicone | 5 | lower than 50 | smaller than 10 | −5 | 0 |
| 5 | Stearic acid | 5 | 715 | smaller than 30 | −3 | x |
| 6 | Zinc stearate | 5 | 140 | " | −4 | x |
| 7 | Ethyl stearate | 5 | 33.4 | " | −2 | x |

In this comparison, the isobutylene oligomer (A) used in Example 1 was replaced by the compound 2,2,4,4,6-pentamethylheptane. In other respects, the compositions and manufacturing conditions were substantially those of Example 1. The above identified compound is such that its n value from the previous chemical formula is 1 and it consists of 3 units of isobutylene.

COMPARISONS 3 TO 7

In comparisons 3 to 7, the isobutylene oligomer (A) used in Example 1 was replaced by olive oil, dimethyl silicone, stearic acid, zinc stearate and ethyl stearate, respectively, and the other compositions and manufacturing conditions thereof were substantially the same as those of Example 1.

As shown in the Table, the stearic acid, zinc stearate and ethyl stearate caused blooming and were not satisfactory in heat resistance, wear resistance and still characteristic. When olive oil was used, it caused no blooming but it had an insufficient still characteristic, and a diminished heat resistance and water resistance. Where dimethyl silicone was used, the friction factor was reduced, but the sample had a low peeling off resistance It should be evident that various modifications and variations can be effected by one skilled in the art without departing from the spirit or scope of the novel concepts of the present invention.

We claim as our invention:
1. A magnetic recording medium comprising:
a non-magnetic base, and
a magnetic layer formed on said non-magnetic base and containing magnetizable particles dispersed in a resinous binder, said magnetic layer including an isobutylene oligomer containing a total of 16 to 52 carbon atoms in sufficient amounts to function as a lubricating agent.
2. A magnetic recording medium according to claim 1 in which:
there are from 2 to 10 parts by weight of said oligomer per 100 parts by weight of resinous binder.
3. A magnetic recording medium according to claim 1 in which:
said isobutylene oligomer contains a total of from 5 to 10 isobutylene units.
4. A magnetic recording medium according to claim 1 in which:
there are from 1 to 15 parts by weight of said oligomer per 100 parts by weight of resinous binder.

* * * * *